United States Patent
Verstraete et al.

(10) Patent No.: US 10,929,448 B2
(45) Date of Patent: Feb. 23, 2021

(54) DETERMINING A CATEGORY OF A REQUEST BY WORD VECTOR REPRESENTATION OF A NATURAL LANGUAGE TEXT STRING WITH A SIMILARITY VALUE

(71) Applicant: KBC Groep NV, Brussels (BE)

(72) Inventors: Hans Verstraete, Schilde (BE); Hans Verstraete, Schoten (BE); Pieter Van Hertum, Hechtel-Eksel (BE); Rahul Maheshwari, Halle (BE); Jeroen D'Haen, Sint-Amandsberg (BE); Michaël Mariën, Bertem (BE); Barak Chizi, Woluwe (BE); Frank Fripon, Kortenaken (BE); Sven Evens, Kortenberg (BE)

(73) Assignee: KBC GROEP NV, Brussels (BE)

( * ) Notice: Subject to any disclaimer, the term of this patent is extended or adjusted under 35 U.S.C. 154(b) by 111 days.

(21) Appl. No.: 16/100,965

(22) Filed: Aug. 10, 2018

(65) Prior Publication Data

US 2020/0026773 A1    Jan. 23, 2020

(30) Foreign Application Priority Data

Jul. 20, 2018 (EP) .................... 18184857

(51) Int. Cl.
*G06F 40/35* (2020.01)
*G06Q 40/08* (2012.01)
(Continued)

(52) U.S. Cl.
CPC .......... *G06F 16/3347* (2019.01); *G06F 16/35* (2019.01); *G06F 40/232* (2020.01);
(Continued)

(58) Field of Classification Search
CPC ........ G06F 40/20; G06F 40/268; G06F 40/30; G06F 40/35; G06F 16/3347; G06Q 40/08; G06N 20/20
(Continued)

(56) References Cited

U.S. PATENT DOCUMENTS

| | | | |
|---|---|---|---|
| 5,754,978 A * | 5/1998 | Perez-Mendez | G10L 15/32 704/239 |
| 6,526,380 B1 * | 2/2003 | Thelen | G10L 15/32 704/251 |

(Continued)

FOREIGN PATENT DOCUMENTS

| | | |
|---|---|---|
| WO | 2001/013295 A1 | 2/2001 |
| WO | 2001/080128 A2 | 10/2001 |
| WO | 2012/075442 A1 | 6/2012 |

OTHER PUBLICATIONS

"Natural Language processing"—WikipediA: (https://en.wikipedia.org/w/index.php?title=Natural_language_processing&oldid=850284867); retrieved on Aug. 13, 2018 in 9 pages.

*Primary Examiner* — Martin Lerner
(74) *Attorney, Agent, or Firm* — Hodgson Russ, LLP

(57) ABSTRACT

A computer-implemented method determines a category of a request provided by a user by means of a user device. The user device includes connection means and means for receiving a request description relating to said request from said user. The method includes receiving, from the user, the request description, by means of the device, and uploading the request description to a server. The server has access to a database which includes a number of previously categorized requests each including a category and a vocabulary, which includes a number of word vector representations. The method further includes identifying, by the server, a number of component words belonging to a natural language text string included in the request description; obtaining, for (Continued)

at least one of the component words, an associated word vector representation from the vocabulary, and determining a request vector, based on at least one obtained word vector representation.

11 Claims, 4 Drawing Sheets

(51) Int. Cl.
*G06F 16/33* (2019.01)
*G06F 16/35* (2019.01)
*G06F 40/268* (2020.01)
*G06F 40/232* (2020.01)
*G06K 9/34* (2006.01)
*G06N 5/04* (2006.01)

(52) U.S. Cl.
CPC .......... *G06F 40/268* (2020.01); *G06K 9/344* (2013.01); *G06N 5/046* (2013.01)

(58) Field of Classification Search
USPC ............. 704/1, 9, 10; 706/20; 707/731, 749; 705/4
See application file for complete search history.

(56) References Cited

U.S. PATENT DOCUMENTS

| | | | |
|---|---|---|---|
| 9,275,635 B1 * | 3/2016 | Beaufays | G10L 15/32 |
| 9,471,887 B2 * | 10/2016 | Shin | G10L 15/1822 |
| 10,133,729 B2 * | 11/2018 | He | G06F 40/30 |
| 2002/0128883 A1 | 9/2002 | Harris | |
| 2003/0145124 A1 | 7/2003 | Guyan et al. | |
| 2007/0226018 A1 | 9/2007 | Gross et al. | |
| 2008/0255887 A1 | 10/2008 | Gruter | |
| 2009/0265193 A1 | 10/2009 | Collins et al. | |
| 2011/0035238 A1 | 2/2011 | Salvagio | |
| 2014/0058763 A1 | 2/2014 | Zizzamia et al. | |
| 2014/0136200 A1 * | 5/2014 | Winter | G10L 15/07 704/244 |
| 2014/0149513 A1 * | 5/2014 | Grennan | G06Q 30/0631 709/204 |
| 2016/0063097 A1 * | 3/2016 | Brown | G06F 16/358 707/737 |
| 2017/0011734 A1 * | 1/2017 | Ganapathy | G10L 15/32 |
| 2017/0018075 A1 * | 1/2017 | Middlebrooks | G06N 20/20 |
| 2017/0308802 A1 * | 10/2017 | Ramsoy | G06N 20/20 |
| 2017/0337587 A1 * | 11/2017 | Niepert | G06Q 30/0271 |
| 2017/0351956 A1 * | 12/2017 | Dubey | G06N 20/00 |
| 2018/0096058 A1 * | 4/2018 | Anderson | G06F 40/00 |
| 2018/0174044 A1 * | 6/2018 | Na | G06K 9/66 |
| 2018/0330735 A1 * | 11/2018 | Strope | G10L 15/26 |
| 2019/0065589 A1 * | 2/2019 | Wen | G06F 16/35 |
| 2019/0197398 A1 * | 6/2019 | Jamali | G06N 5/022 |
| 2019/0221204 A1 * | 7/2019 | Zhang | G06F 40/30 |
| 2019/0297158 A1 * | 9/2019 | Olenoski | G06Q 20/36 |
| 2019/0303799 A1 * | 10/2019 | Gottin | G06N 20/20 |
| 2019/0347326 A1 * | 11/2019 | Kozhaya | G06F 40/30 |

* cited by examiner

DETERMINING A CATEGORY OF A REQUEST BY WORD VECTOR REPRESENTATION OF A NATURAL LANGUAGE TEXT STRING WITH A SIMILARITY VALUE

TECHNICAL FIELD

The invention pertains to the technical field of computer-implemented methods and related systems for processing a request comprising a natural language text input string, said request preferably relating to an insurance claim.

BACKGROUND

WO 01/13295 describes a method for detecting misrepresentation of policy related information provided to an insurer by a policyholder where the information is used by the insurer in determining an amount of premium to be paid for insurance coverage provided to the policyholder, the method comprising: selecting a plurality of insurance policies to process with a predictive model; for each selected policy, deriving variables from policy related information provided by the policyholder in connection with the selected policy; and for each selected policy, applying the derived variables of the policy to the predictive model to generate a model score indicating the relative likelihood of misrepresented information provided by the policyholder or an expected adjustment of the premium on the policy. As such, WO 01/13295 is directed at detecting misinterpretation and is inadequate and/or overly complex for the assessment of (regular) requests such as insurance claims.

US 2014/0058763 describes a fraud detection method, comprising: obtaining data relating to a sample set of claims or transactions made to one of an insurer, guarantor, financial institution, and payer; obtaining external data relating to at least one of the claims, submissions, claimants, incidents and transactions giving rise to the claims or transactions in the set; using at least in part at least one data processing device, identifying from the data and the external data a set of variables usable to discover patterns in the data; using the at least one data processing device, discovering patterns in the set of variables that at least one of: indicate a normal profile of said claims or transactions, indicate an anomalous profile of said claims or transactions, and indicate a high propensity of fraud in said claims or transactions; assigning a new claim, not in the sample set, to at least one of the profiles; and outputting the identified potentially fraudulent new claims to a user as a basis for an investigative course of action. Hence, US 2014/0058763 is directed at fraud detection and lacks means for the actual handling of (regular) requests such as claim descriptions.

Further documents relating to request handling and/or insurance claims include US 2009/0265193, US 2003/0145124, US 2002/0128883, US 2008/0255887, WO 2012/075442, WO 2001/080128A2, US 2007/0226018 and US 2011/0035238. Likewise, the proposed systems and methods lack adequate means for the handling of regular requests and/or are overly complex.

The present invention aims to resolve at least some of the problems mentioned above.

SUMMARY OF THE INVENTION

In a first aspect, the invention provides a computer-implemented method for determining a category of a request provided by a user by means of a user device according to the claims.

According to a second aspect, the present invention offers a system according to the claims.

In a third aspect, the present invention relates to a use according to the claims.

According to yet another aspect, the present invention offers a computer program product according to the claims.

A key advantage of the present invention is that it may reduce the burden on the user, allowing him to input a request by means of a natural language text string. Based on this text string, the invention allows a very quick response in case the text string provides sufficient information to unambiguously derive the category of the request, which may e.g. relate to an insurance claim provided by the user. On the other hand, the invention allows to selectively request intervention of a human operator in case a category cannot be attributed with sufficient certainty. This is beneficial since it provides the user with means for request handling also outside office hours of the human operator and/or without systematically requiring intervention from a human operator.

In a preferred embodiment wherein the invention amounts to image processing, the burden of the user is reduced further, by allowing the request to be submitted as one or more images. This e.g. allows the user to formulate the request on paper and then submit a photograph hereof, optionally together with context-related images, relying on OCR and pattern detection to allow natural language text strings to be detected.

Another merit of the present invention lies in the advantageous incorporation of adequate techniques such as natural language processing and, in a preferred embodiment, machine learning. This allows to build in several safeguards with respect to the automation of request handling. This also relates to various preferred embodiments discussed in the detailed descriptions and the dependent claims.

DETAILED DESCRIPTION OF THE INVENTION

Figure 1:
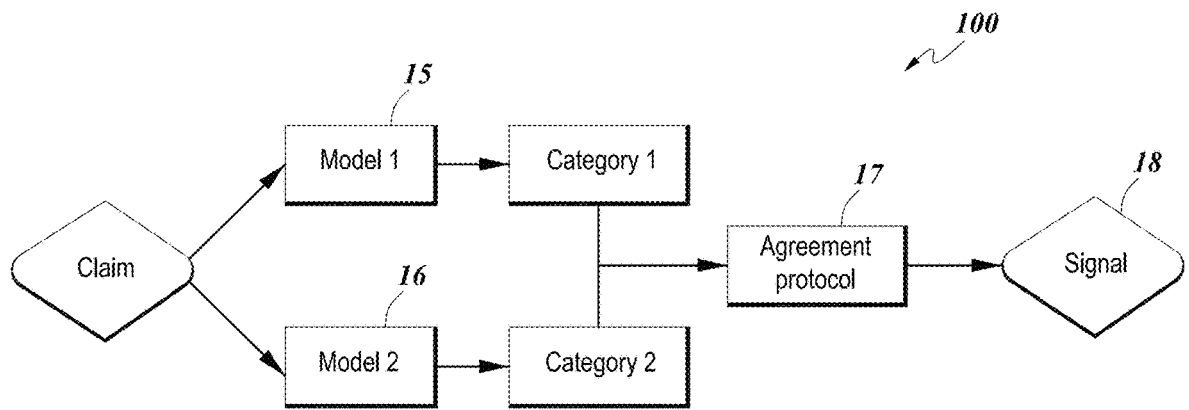
FIG. 1 shows a flowchart of an example embodiment of the present invention.

The present invention relates to a computer-implemented method, a system, a computer program product, and a use of the computer-implemented method. In what follows, the invention is described in detail, embodiments of the invention are discussed, and the invention is illustrated by means of examples.

In the context of this document, the term "system" and "computer system" are used interchangeably.

In this document, the acronym CNN refers to a convolutional neural network, a machine learning technique. The term "image" relates to a digital photograph, screenshot or digital drawing or any combination thereof and may be in any pixel-based or vector-based file format, such as PNG, JPEG, GIF, TIFF, EPS, EMF or PDF.

"Policyholder" is an entity that obtains an insurance policy from an insurer. The policyholder may be a business or an individual. It is assumed that, if the request relates to an insurance claim, the insurance claim relates to said policyholder. The policyholder wishes to minimize exposure to certain risks, such as the risk of loss of life, health, livelihood, property, or profitability or the like, for which there are one or more corresponding "insurance policies", or, for short, one or more "policies", e.g., life, health, disability, home and automobile, and liability insurance.

The risks covered by a policy may arise as risks to persons such as the employees, children, and others who are generally understood to be under the control or supervision of the policyholder or risks to property also under the control, ownership or supervision of the policyholder. The policyholder and/or those persons under the control or supervision of the policyholder generally engage in activities which may result in losses to the policyholder, persons under the control or supervision of the policyholder, or third parties. The policyholder purchases insurance from an insurer such that those losses that are suffered by the policyholder directly or that would (in the absence of insurance) result in claims made against the policyholder become, by proxy, claims against the insurer. The insurer insures the activities by compensating the claimants in accordance with the terms of the policy. The scope of each policy is determined by a certain coverage.

In an example embodiment of the invention, the requests relate to insurance claims. A key matter in such case is whether an insurance claim, i.e. the risk relating to said insurance claim, is covered by a given policy or the combination of policies held by the policyholder. The policy information characterizes the coverage of said at least one policy in terms of a plurality of insurance variables comprised in said policy information. The insurance variables relate to the policy and may be references to e.g. objects, persons or actions. This may concern for instance an object such as a car in case of a car insurance, a person or the relation to that person, such as employee or child, or an action, such as "drive" and "park", relating to e.g. car insurance.

With respect to embodiments relating to requests being insurance claims, while it is stated at various points in this document that the policyholder is also the person who provides the claim description, in another embodiment this may be done also by another person such as an insurance agent. Relatedly, the "policyholder device" refers to a generic device comprising a user input and a screen. Hereby, the device may belong to a second person different from the policyholder, and a third person different from said policyholder and different from said second person may be the user that uses the means for user input and/or reads out information on the screen. The policyholder device may concern any computing device. A non-limiting list of examples comprises a desktop, a laptop, a tablet, a smartphone, a smartwatch, a server, a supercomputer, a calculator, a music player, a game console, and the like.

"Means for user input" refers to any device configured for providing input by a user, such as the policyholder, to a computing device. The input is not limited by modality and can encompass typing, speech recording and video recording. The input can be discrete and/or continuous. The input can be direct or indirect. In a preferred embodiment, the input comprises text that is typed out manually. In an alternative embodiment, the input comprises words spoken out loud and converted to text by means of speech-to-text conversion and related well-known methods. A non-limiting list of examples of means for user input comprise a keyboard, a touchscreen, a computer mouse, a camera, a scanner, a joystick, a microphone, a light pen, a trackball, a projected keyboard, a game controller, a card reader, and the like.

According to several aspects set out in the summary section, the present invention provides a computer-implemented method, a system, a use of the computer-implemented method according to the present invention in the system according to the present invention, a use of the computer-implemented method according to the present invention. One of ordinary skill in the art will appreciate that the computer-implemented method comprises steps which the server and user device may be configured to execute, and that the computer program product comprises according instructions. One of ordinary skill in the art will furthermore appreciate that the system according is configured for performing the steps of the computer-implemented method. Therefore, in this document, no distinction is made between the different aspects of the present invention, and each element of the disclosure may relate to each of the different aspects of the present invention.

In a preferred embodiment, said receiving of a request, preferably said second claim description in step (i) in case step (h) is negative, comprises generating a targeted question for said user, preferably said policyholder, to request for said request, preferably said second claim description, said generating of said targeted question based on processing of said value list to determine a missing value relating to said variables, preferably insurance variables, said targeted question targeting said missing value. Such generation of a targeted question is advantageous since it allows to efficiently add further information to the information gathered already, as represented by the value list.

According to another embodiment, the processing of the natural language text string, preferably said processing in step (e), is based on natural language processing, wherein optionally said generating of said targeted question relates to natural language processing. This is advantageous since it facilitates the user, preferably the policyholder, in entering the request description, preferably the claim description, allowing him/her to enter intuitive sentences rather than formalized parameters.

In yet another embodiment, said policy information comprises a decision tree, wherein said plurality of insurance variables relates to said decision tree for assessing of said insurance claim based on said plurality of insurance variables; wherein at least said generating in step (j) is based on said decision tree; wherein optionally said mapping in step (f) and/or said processing in step (h) is based on said decision tree. This is advantageous because it provides an insurer with an intuitive tool, making the invention more manageable. The use of decision trees is common in the assessment of insurance claims, whereby a step-by-step providing of information by the policyholder may allow to specify the insurance claim in full and/or to determine whether the insurance claim is covered by a policy. Such decision trees may be used in a computer system but may also be used in other ways.

In another preferred embodiment, said determining in step (h) whether said insurance claim can be derived unambiguously comprises determining whether a confidence indicator exceeds a predefined confidence threshold. In view of the methods that may preferably be used in step (h), including advanced machine learning techniques, it may be advantageous to accommodate for a confidence threshold, e.g. 90 percent confidence or 95 percent confidence, rather than operating strictly according to a binary decision. Furthermore, incorporating such a confidence threshold provides for a parameter that can be configured by the insurer based on the overall performance of a given embodiment of the invention. Lowering the confidence threshold may result in faster user experience for the policyholder but less accurate assessment, whereas increasing the confidence threshold may result in a more accurate assessment at the cost of a more involved user experience for the policyholder.

In yet another embodiment, said claim description comprises a text string and one or more claim specification values, wherein said claim specification values relate to an identity of said policyholder and or a specification of said at least one policy held by said policyholder. This is particularly advantageous in cases where the policyholder has a clear idea on the policy covering the insurance claim, as e.g. in the case of basic car damage and a car insurance. In such cases, the policyholder may include in the claim description a specification of the policy to which the insurance claim relates.

According to a preferred embodiment, step (i) involves the evaluation of said value list with respect to an assistance criterion if step (h) is negative; wherein said evaluation being positive results in said assessment indicating that an intervention from a human claim handler is required. This is advantageous since it effectively implements a job scheduler wherein certain jobs, typically more complicated jobs, are handed to a human claim handler and other jobs, typically more clear-cut jobs, are handled automatically and according to the present invention.

In another preferred embodiment, step (i) involves the comparison of an iteration counter to a predefined maximum if step (h) is negative; wherein said jumping to step (d) results in said iteration counter being augmented with one unit; wherein said second claim description is not received if said predefined maximum is exceeded, and wherein said exceeding preferably results in said assessment indicating that the assessment is undecided and/or in said assessment indicating that an intervention from a human claim handler is required. Such an embodiment is advantageous since it may prevent the claim handling process being too involved for a policyholder, triggering e.g. an intervention of a human claim handler after a certain low number of iterations, preferably less than 10 iterations, e.g. 2, 3, 4 or 5 iterations.

According to an embodiment of the invention, said assessment indicates that an intervention from a human claim handler is required, wherein said intervention taking place results in an update of said policy information. Such an embodiment advantageously combines the job of handling a current claim with the overall aim of improving the policyholder experience and the service performance, by updating the policy information during the execution of tasks, rather than performing updates regardless of the tasks being executed.

In another preferred embodiment, said processing of said text string in step (e) and/or said mapping in step (f) and/or said processing in step (h) and/or said generating in step (j) and/or optionally said generating of said targeted question is based at least partially on one or more of the following: a linear classifier such as a Fisher's linear discriminant, logistic regression, naive Bayes classifier, or perceptron; support vector machines; a quadratic classifier; a kernel estimation method such as k-nearest neighbor; boosting; a decision-tree-based technique such as random forests; neural networks including extreme and deep learning; learning vector quantization; a Bayesian procedure, discriminant analysis (linear, quadratic); Word2vec, WordRank, FastText, WordNet; natural language processing; reinforcement/adaptive/active learning; latent Dirichlet allocation; non-negative matrix factorization; t-SNE clustering. Such embodiment advantageously leverages the potential of the invention to incorporate both basic and advanced machine learning techniques in an adequate way.

In yet another embodiment, a notification relating to said assessment generated in step (j) is sent to said policyholder device and is displayed on said screen. Such an embodiment may lead to an improved user experience for the policyholder, who is informed immediately with respect to the coverage of the insurance claim and potential further steps.

In a preferred embodiment, said policy information comprises historical records with respect to past insurance claims, preferably along with their assessment. In such an embodiment, the processing of said text string in step (e) and/or said mapping in step (f) and/or said processing in step (h) and/or said generating in step (j) and/or optionally said generating of said targeted question is based at least partially on said historical records. Such an embodiment is particularly advantageous when combined with said basic and advanced machine learning techniques listed in this document, because it allows to leverage the potential of those techniques to a larger extent.

In a preferred embodiment, said machine learning model to which said second model relates and/or said identifying (32) of said plurality of component words (320) and/or said determining (34) of said request vector (340) and/or said determining (35) of said similarity value (351) is based at least partially on one or more of the following: a linear classifier such as a Fisher's linear discriminant, logistic regression, naive Bayes classifier, or perceptron; support vector machines; a quadratic classifier; a kernel estimation method such as k-nearest neighbor; boosting; a decision-tree-based technique such as random forests; neural networks including extreme and deep learning; learning vector quantization; a Bayesian procedure, discriminant analysis (linear, quadratic); Word2vec, WordRank, FastText, WordNet; natural language processing; reinforcement/adaptive/active learning; latent Dirichlet allocation; non-negative matrix factorization; t-SNE clustering.

The present invention in all its aspects is advantageous in its adaptive nature, allowing to iteratively build up full information on an insurance claim, based on one or more claim descriptions. Hereby, "insurance claim" refers to the actual insurance claim as it would be formulated by an expert or person knowledgeable in the field of insurance. This is opposed to a "claim description", concerning the account of the insurance claim according to the policyholder, who is in general no expert and/or is in general not familiar with the details of the policies. Due to this, the claim description may lack information that is vital for the identification of the insurance claim. Furthermore, the claim description may contain supplementary information and/or natural language elements which are not relevant and/or necessary for the identification of the insurance claim.

A key advantage of the present invention is that it may reduce the burden on the policyholder, no longer requiring him to specify the insurance claim in its entirety in a single stage. Based on a text string provided by the policyholder, the invention allows a very quick response in case the text string provides sufficient information to unambiguously derive the insurance claim from the claim description provided by the policyholder. On the other hand, the invention allows the policyholder to iteratively provide further input until sufficient information on the insurance claim is built up. For the policyholder, this leads to better and more efficient assessment of insurance claims. For the insurer, this is beneficial since it provides the policyholder with means for claim handling also outside office hours and/or without systematically requiring intervention from a human claim handler.

In a further aspect, the present invention provides a use of the computer-implemented method according to the present invention for updating a decision tree by a human claim handler, preferably by means of a system according to the present invention, wherein said decision tree is comprised in policy information, wherein a plurality of insurance variables relates to said decision tree for assessing of an insurance claim based on said plurality of insurance variables; and wherein the generating of an assessment of said insurance claim is based on said decision tree. This use is advantageous because it may uniquely contribute to the generation of appropriate decision trees. The use of decision trees is common in the assessment of insurance claims, whereby a step-by-step providing of information by the policyholder may allow to specify the insurance claim in full and/or to determine whether the insurance claim is covered by a policy. Such decision trees may be used in a computer system but may also be used in other ways. Hence, the present invention may contribute to development of improved decision trees by the human claim handler with a computer-implemented method that provides such improved decision trees as part of its functioning.

Another merit of the present invention lies in the advantageous incorporation of adequate techniques such as natural language processing and decision trees. This also relates to various preferred embodiments discussed in the detailed descriptions and the dependent claims.

According to a further aspect, which is not intended to limit the scope of the invention, the invention relates to following points 1-15.

1. Computer-implemented method for generating an assessment of an insurance claim provided to an insurer by a policyholder, said method comprising the steps of:
   (a) providing a server comprising a database, a processor, tangible non-volatile memory and program code present on said memory for instructing said processor, said database comprising policy information with respect to at least one policy held by said policyholder, said policy information characterizing a coverage of said at least one policy in terms of a plurality of insurance variables comprised in said policy information, said plurality of insurance variables preferably relating to a decision tree comprised in said policy information;
   (b) providing a policyholder device comprising a processor, a means for user input and a screen;
   (c) receiving a claim description describing said insurance claim from the policyholder via said means for user input of said policyholder device; said claim description comprising a text string and optionally one or more claim specification values;
   (d) sending said claim description from said policyholder device to said server;
   (e) processing said text string comprised in said claim description, said processing preferably based on natural language processing, said processing involving an extraction of one or more entities from said text string;
   (f) mapping said one or more entities to values of said insurance variables, obtaining mapped values of said insurance variables;
   (g) adding said mapped values to a value list;
   (h) processing said value list to determine whether said insurance claim can be derived unambiguously from said value list;
   (i) if step (h) is negative, receiving a second claim description describing said insurance claim from the policyholder via said means for user input of said policyholder device; said second claim description comprising a second text string and one or more optional further claim specification values and jumping to step (d) with said second claim description as claim description; if step (h) is positive, proceeding to step (j);
   (j) generating said assessment of said insurance claim based on said value list, said assessment comprising at least an indication of whether said insurance claim is covered by said at least one policy.

2. Computer-implemented method according to point 1, wherein said receiving of a second claim description in step (i) in case step (h) is negative comprises generating a targeted question for said policyholder to request for said second claim description, said generating of said targeted question based on processing of said value list to determine a missing value relating to said insurance variables, said targeted question targeting said missing value.

3. Computer-implemented method according to points 1 or 2, wherein said processing in step (e) is based on natural language processing, and wherein optionally said generating of said targeted question relates to natural language processing.

4. Computer-implemented method according to points 1-3, wherein said policy information comprises a decision tree, wherein said plurality of insurance variables relates to said decision tree for assessing of said insurance claim based on said plurality of insurance variables; wherein at least said generating in step (j) is based on said decision tree; wherein optionally said mapping in step (f) and/or said processing in step (h) is based on said decision tree.

5. Computer-implemented method according to points 1-4, wherein said determining in step (h) whether said insurance claim can be derived unambiguously comprises determining whether a confidence indicator exceeds a predefined confidence threshold.

6. Computer-implemented method according to points 1-5, wherein said claim description comprises a text string and one or more claim specification values, wherein said claim specification values relate to an identity of said policyholder and or a specification of said at least one policy held by said policyholder.

7. Computer-implemented method according to points 1-6, wherein step (i) involves the evaluation of said value list with respect to an assistance criterion if step (h) is negative; wherein said evaluation being positive results in said assessment indicating that an intervention from a human claim handler is required.

8. Computer-implemented method according to points 1-7, wherein step (i) involves the comparison of an iteration counter to a predefined maximum if step (h) is negative; wherein said jumping to step (d) results in said iteration counter being augmented with one unit; wherein said second claim description is not received if said predefined maximum is exceeded, and wherein said exceeding preferably results in said assessment indicating that the assessment is undecided and/or in said assessment indicating that an intervention from a human claim handler is required.

9. Computer-implemented method according to points 7-8, wherein said assessment indicates that an intervention from a human claim handler is required, and wherein said intervention taking place results in an update of said policy information.

10. Computer-implemented method according to points 1-9, wherein said processing of said text string in step (e) and/or said mapping in step (f) and/or said processing in step (h) and/or said generating in step (j) and/or optionally said generating of said targeted question is based at least partially on one or more of the following: a linear classifier such as a Fisher's linear discriminant, logistic regression, naive Bayes classifier, or perceptron; support vector machines; a quadratic classifier; a kernel estimation method such as k-nearest neighbor; boosting; a decision-tree-based technique such as random forests; neural networks including extreme and deep learning; learning vector quantization; a Bayesian procedure, discriminant analysis (linear, quadratic); Word2vec, WordRank, FastText, Word Net; natural language processing; reinforcement/adaptive/active learning; latent Dirichlet allocation; non-negative matrix factorization; t-SNE clustering.

11. Computer-implemented method according to points 1-10, wherein a notification relating to said assessment generated in step (j) is sent to said policyholder device and is displayed on said screen.

12. System for generating an assessment of an insurance claim provided to an insurer by a policyholder, said system comprising
   a server comprising a database, a processor, tangible non-volatile memory and program code present on said memory for instructing said processor, said database comprising policy information with respect to at least one policy held by said policyholder, said policy information characterizing a coverage of said at least one policy in terms of a plurality of insurance variables comprised in said policy information, said plurality of insurance variables preferably relating to a decision tree comprised in said policy information;
   a policyholder device comprising a processor, a means for user input and a screen;
   said system configured for executing the subsequent steps (c)-(j):
   (c) receiving a claim description describing said insurance claim from the policyholder via said means for user input of said policyholder device; said claim description comprising a text string and optionally one or more claim specification values;
   (d) sending said claim description from said policyholder device to said server;
   (e) processing said text string comprised in said claim description using natural language processing, said processing involving an extraction of one or more entities from said text string;
   (f) mapping said one or more entities to values of said insurance variables, obtaining mapped values of said insurance variables;
   (g) adding said mapped values to an value list;
   (h) processing said value list to determine whether said insurance claim can be derived unambiguously from said value list;
   (i) if step (h) is negative, receiving a second claim description describing said insurance claim from the policyholder via said means for user input of said policyholder device; said second claim description comprising a second text string and one or more optional further claim specification values and jumping to step (d); if step (h) is positive, proceeding to step (j);
   (j) generating said assessment of said insurance claim based on said value list, said assessment comprising at least an indication of whether said insurance claim is covered or not.

13. Use of the computer-implemented method according to points 1-11 in the system according to point 12.

14. Use of the computer-implemented method according to points 9-11 for updating a decision tree by a human claim handler, preferably by means of a system according to point 12, wherein said decision tree is comprised in policy information, wherein a plurality of insurance variables relates to said decision tree for assessing of an insurance claim based on said plurality of insurance variables; and wherein the generating of an assessment of said insurance claim is based on said decision tree.

15. Computer program product for generating an assessment of an insurance claim provided to an insurer by a policyholder, said computer program product comprising instructions for execution on a policyholder device comprising a processor, a means for user input and a screen; the computer program product comprising instructions for:
   receiving a claim description describing said insurance claim from the policyholder via said means for user input; said claim description comprising a text string and optionally one or more claim specification values;
   sending said claim description to said server;
   receiving a targeted question from said server; said targeted question intended for said policyholder to request for a second claim description, said generating of said targeted question based on a missing value relating to said insurance variables, said targeted question targeting said missing value;
   receiving a second claim description from said policyholder via said means for user input in response to said targeted question;
   sending said second claim description to said server;
   optionally, receiving one or more further targeted questions from said server, receiving one or more further claim descriptions from said policyholder and sending said one or more further claim descriptions to said server;
   receiving a notification from said server; said notification relating to said assessment of said insurance claim; said assessment based on said claim description, said second claim description and optionally on said one or more further claim descriptions.

The invention is further described by the following non-limiting examples which further illustrate the invention, and are not intended to, nor should they be interpreted to, limit the scope of the invention.

EXAMPLES

Example 1: Example Method

Figure 5:
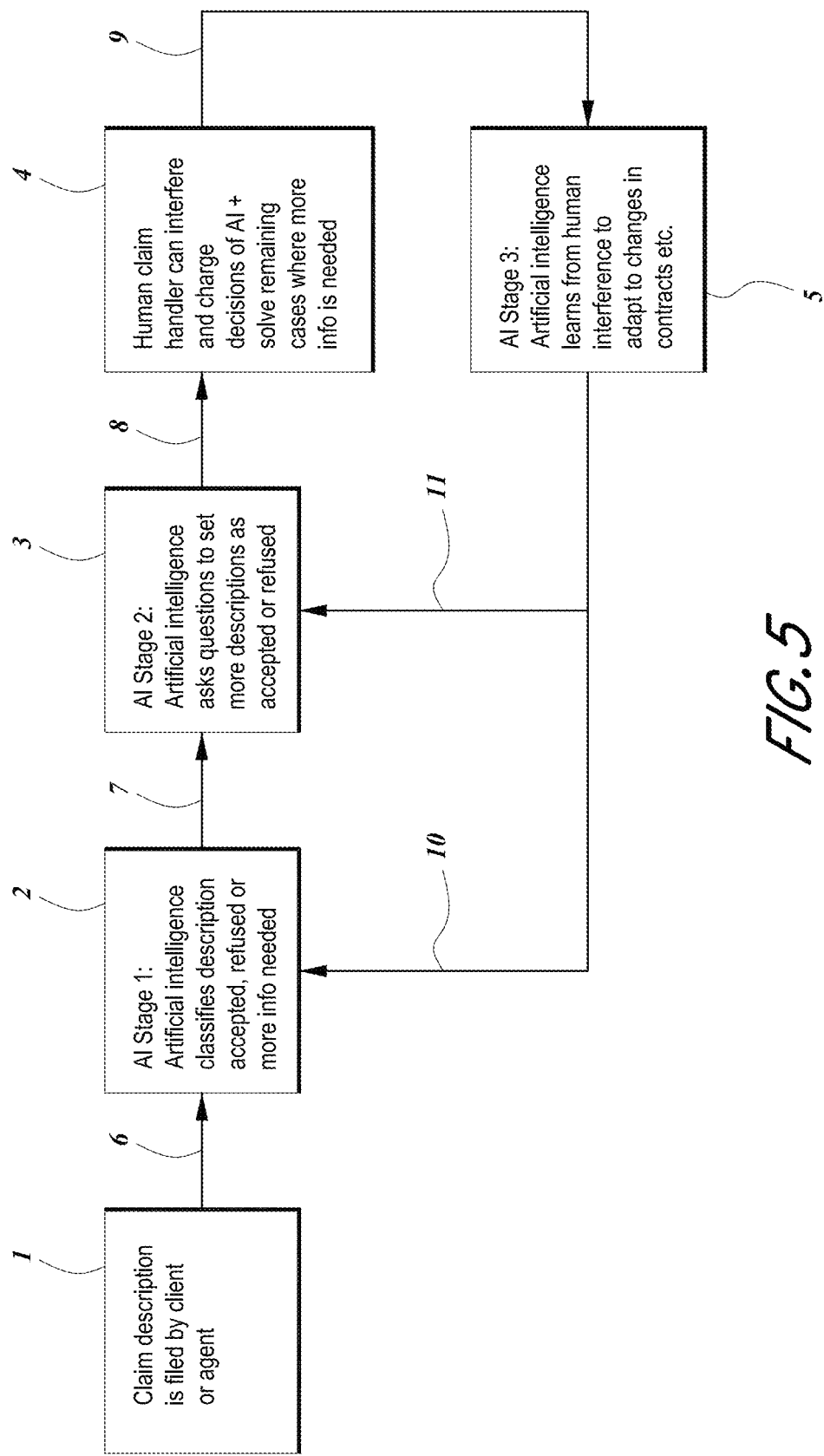
FIG. 5 shows a diagram of an example method according to the present invention.

FIG. 5 shows a diagram 500 of an example method according to the present invention. The method allows generating an assessment of an insurance claim provided to an insurer, referred to as agent in this example, by a policyholder, referred to as client in this example. The method involves machine learning, referred to in this example as artificial intelligence (AI).

In a first step 1, the insurance claim is described by the user, i.e. the client or agent, in the form of a claim description. This claim description is entered in a user device (client device or agent device) and is submitted 6 to a server handling the assessment of the insurance claim.

In a second step 2, also referred to as "AI stage 1", one or more machine learning algorithms are applied to the claim description. The aim of this stage is to determine whether the insurance claim, based on the claim description, should be accepted, refused, or whether more information is required in the form of a second claim description. Preferably, this includes processing a text string comprised in the claim description by means of natural language processing, in order to obtain one or more entities that may be mapped to pre-defined insurance variables. The mapped values are added to a value list. Preferably, the method has access to historical insurance data to improve the quality of the mapping. This historical data comprises descriptions of the circumstances that lead to the claim and the decision made by the claim handler regarding whether a given claim description was accepted, was refused or led to a request for more information.

Regardless of the outcome of the second step 2, the insurance claim is presented to the human claim handler for inspection (not shown). In an alternative embodiment, a corresponding notification may be sent (not shown) immediately to the user (i.e. the client/agent).

If the outcome of the second step 2 is that further information should be requested, the claim description and corresponding value list are carried over 7 to a third step 3, also referred to as "AI stage 2". The aim of this stage is to generate targeted questions and interact with the user (not shown) to retrieve a second claim description and optionally further claim descriptions. Hereby, the aim is to attempt to set more insurance claims to accepted or refused, while at the same time not overburdening the user with too many questions.

Regardless of the outcome of the second step 2, the insurance claim is forwarded to the human claim handler for last inspection (not shown). In an alternative embodiment, a corresponding notification may be sent (not shown) immediately to the user (i.e. the client/agent).

If the outcome of the third step 2 is that a given insurance claim cannot be identified, the claim description and corresponding value list are carried over 8 to a fourth step 4, wherein a human claim handler intervenes. In this step, the human claim handler may resolve remaining open insurance claims. Hereby, the human claim handler may change decisions taken by the AI algorithms. For each insurance claim for which the final status is confirmed, a corresponding notification is sent (not shown) to the user (i.e. the client/agent).

Whenever a decision taken by the AI algorithm in the second step 2 or the third step 3 is deemed incorrect by the claim handler in the fourth step 4, this information is captured and is taken into account by the model instantaneously, by carrying it over 9 to a fifth step 5, also referred to as "AI stage 3". This may lead to updates of policy information, and may for instance allow AI algorithms to learn from human interference to adapt to changes in contracts. These updates are fed back to 10 the second stage 2 and the third stage 3.

Example 2: First Example Interaction

The present example illustrates the interaction with a policyholder, or, equivalently, a user, in the context of a method according to Example 1, where the policy concerns a car insurance. The below table illustrates possible contents of the interaction. Hereby, "policy x" is an arbitrary name for a policy.

| Description | Stage 1 decision | Stage 2 possible question | Reason question |
|---|---|---|---|
| Drove over a ditch | Requires more info | Are only the tires damaged? | Only tire damage is not covered. |
| Hit a tree while parking | Accepted | | Covered by policy x. |
| Someone scratches the car. Vandalism. | Accepted | | Covered by policy x. |
| Interior of car was damaged while putting dog food in the car. | Refused | | No coverage for damage caused by loading of vehicle. |

Example 3: Second Example Interaction

This third example illustrates another interaction with a policyholder, or, equivalently, a user, in the context of a method according to Example 1 and 2, where the policy concerns a car insurance. In this example, the human claim handler intervened because of changes in a contract, whereby the contract now also accepts car damage but no longer covers vandalism. The below table illustrates corresponding interactions.

| Description | Stage 1 decision | Human correction stage 1 | Stage 1 updated decision |
|---|---|---|---|
| Drove over a ditch | Requires more info | Accepted | Accepted |
| Hit a tree while parking | Accepted | | |
| Someone scratches the car. Vandalism. | Accepted | Refused | Refused |
| Interior of car was damaged while putting dog food in the car. | Refused | | |

Example 4: Example of General Workflow

FIG. 1 shows a workflow 100 according to an example embodiment. It concerns a system that processes insurance claims. Based on the description of the claim, the system suggests a categorization. This categorization is then used to calculate generate one or more output signals. The categorization follows a tree like structure. The categorization path is defined by the claim description text, or a derivation of that text. The system has two main components: model 1 (15) and model 2 (16). These models collaborate to create the output signal by each assigning a category and passing through an agreement protocol 17. The signal 18 can be an action, such as paying out a claim, and/or a message on a mobile device, such as "Your claim is covered by your insurance", and/or any other relevant output.

The first main component of the invention consists of the models 15, 16. The models make the translation between an incoming claim text to a category. The invention is not limited to two models and may be extended to more than two models, e.g. three models, four models, more than three models, more than four models. The second main component is the agreement protocol module 17. This module integrates the model outputs (categories) into a single output (category). The agreement policy protocol is preferably defined by a human expert, who writes out how the categories of the separate models are integrated into a single category. The final main component is the signal 18. Signals are an action linked to a category, a schema that is defined by human experts.

Human experts can intervene at any time and change the scheme, without impacting the other components of the invention. For example, if the terms and conditions of an insurance policy change, the change can be reflected in the system by changing the signals linked to the respective categories.

Example 5: Example of Specific Workflow

Figure 2:
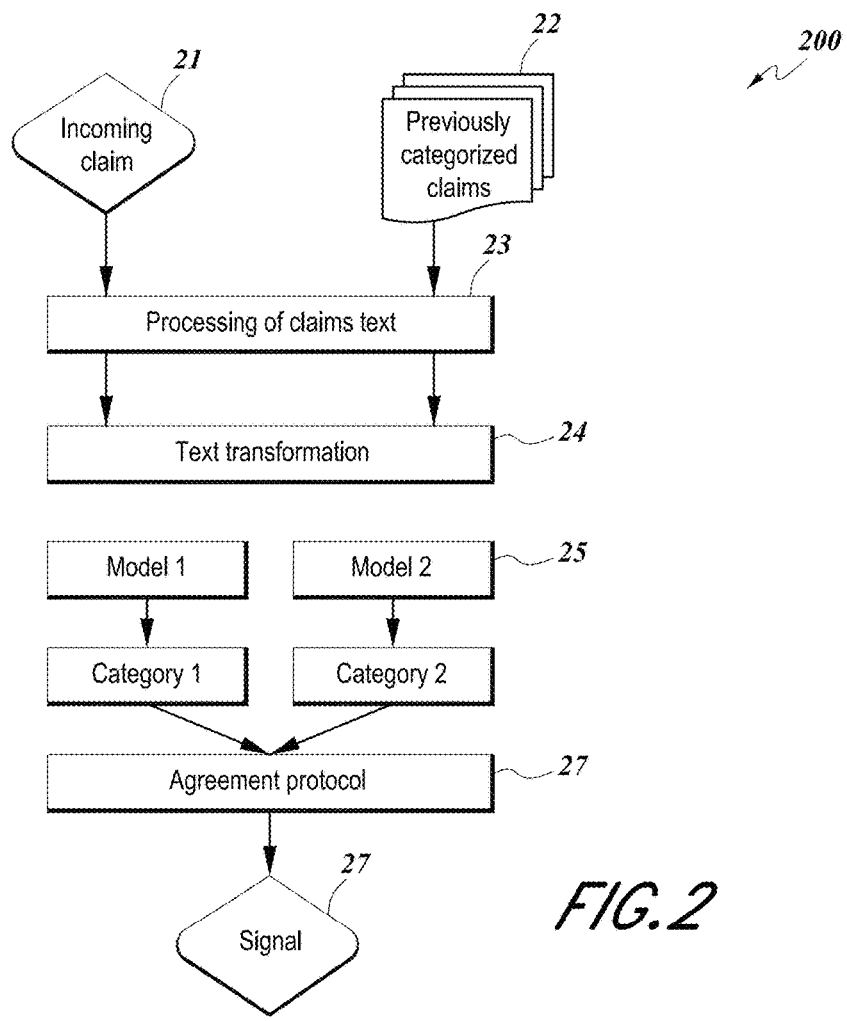
FIG. 2 shows a flowchart of an example embodiment of the present invention.

FIG. 2 shows a workflow 200 according to another example embodiment. It is described with reference to an example embodiment of the system, but it may equally relate to an embodiment of the method according to the present invention. The input to the categorization is the description of a claim 21 which can be generated by a physical person (such as the insured person or an intermediary such as an insurance agent). The claim description can be inputted using a variety of methods: typed, spoken (and converted to text using speech-to-text techniques), handwritten (and converted to text using OCR techniques), among others. Next to an incoming claim there is a repository of claim descriptions 22 that were previously categorized. Both the incoming claim 21 and the repository of claims 22 pass through the following steps 23, 24.

The text goes through an optional preprocessing step 23. Preferred operations in the preprocessing step are spelling correction and stemming or lemmatization.

The previously categorized claims are used to build the vocabulary for the system. The words in this vocabulary are transformed into a dense low-dimensional distributed representation such as a numeric vector using techniques and algorithms like Word2vec, Doc2vec, GloVe, WordRank, FastText, Wordnet, latent Dirichlect allocation, singular value decomposition, non-negative matrix factorization, term frequency-inverse document frequency statistic among others. A combination of several techniques is also possible. This vocabulary is updated in the feedback loop so that the system can learn new words and their representation. Next, the input claim description is broken down into component words whose vector representations are retrieved from the system vocabulary. These component word vectors are combined using vector arithmetic to form a distributed vector representation of the whole claim 24.

Using this numeric vector representing the claim, a classification is done, mapping the claim to the (sub)category it belongs to. This classification can be executed by several techniques 25. In a preferred embodiment, Model 1 relies on a distance measure and/or a similarity measure, more preferably the cosine similarity:

$$\cos \theta = \frac{\vec{a} \cdot \vec{b}}{\|\vec{a}\| \|\vec{b}\|}.$$

It compares an incoming claim to the claims in the repository. This gives the system the advantage of avoiding the cold start problem. In theory, only a single previously categorized claim is needed per (sub)category for the system to work. As a result, additional categories can be added in a straightforward and easy manner. In a preferred embodiment, the distance/similarity-based Model 1 is advantageously combined with a complementary technique represented by Model 2, preferably a deep learning technique such as Convolutional Neural Networks (CNN), which is found particularly suitable for learning complex relations.

The models provide a first safeguard. These safeguards flag claims (e.g. as "Uncertain") if the system is unsure about its categorization. The CNN has built-in techniques that return a certainty level for each category, where a threshold can be put on that certainty level, such that the categorization system will only predict a certain category if the CNN has a certainty higher than that threshold. Using the cosine similarity, this effect can be accomplished by not only looking at the closest previously categorized claim, but at the N closest claims. If these previously categorized claims have different categories, the incoming claim is flagged as "Uncertain". The used threshold can be optimized according to a trade-off between accuracy and the amount of "Uncertain" flagged claims. Demanding a higher accuracy will lead to more "Uncertain" claims that have to be handled by a human expert.

The agreement protocol provides a second safeguard 26. It decides how the outputs of the models are integrated into a single category. For example, in one such schema a category is assigned to a claim if both models predict the same category (not "Uncertain"), otherwise the claim is flagged as "Uncertain". Another scheme might be that 1 model has preference over another and can also predict the category if the other model flagged the incoming claim as "Uncertain". Again, "Uncertain" flagged claims will go to a human expert. This preferably relates to a predefined confidence level. The more certainty is required with respect to a category, the higher the number of claims is labeled as "Uncertain".

The first and second safeguard also provide the possibility to add a (semi)automated feedback loop. For example, "Uncertain" claims go to a human expert to manually assign a category. These claims can then be added to the repository of previously categorized claims so they are taken into account for new claims. Moreover, if a specific previously categorized claims often pop up as most similar in "Uncertain" claims, it can go human expert as well for a manual check.

If the categorization system assigns a final (sub)category, that passes the safeguard(s), this category is sent to the decision system. This decision system is built by human experts, and contains the details of the insurance contracts, stating which categories are covered by which policies. When the relevant insurance policies change, this system can be easily updated without the need to make any modifications to the rest of the system. Signals linked to a category can be added, removed or altered without an impact on the system's categorization quality (27). This decision system then generates one or more signals, which are sent to an output device. This device can be a computer, smartphone, database, etc. The signal can be a decision, action or the like. The signals can be sent directly to the end user who submitted the claim or the human expert in between who can monitor or customize the signal before transmitting it to the end user. Signals linked to a category can be added, removed or altered without an impact on the system's categorization quality.

Example 6: Single Model Example

Figure 3:
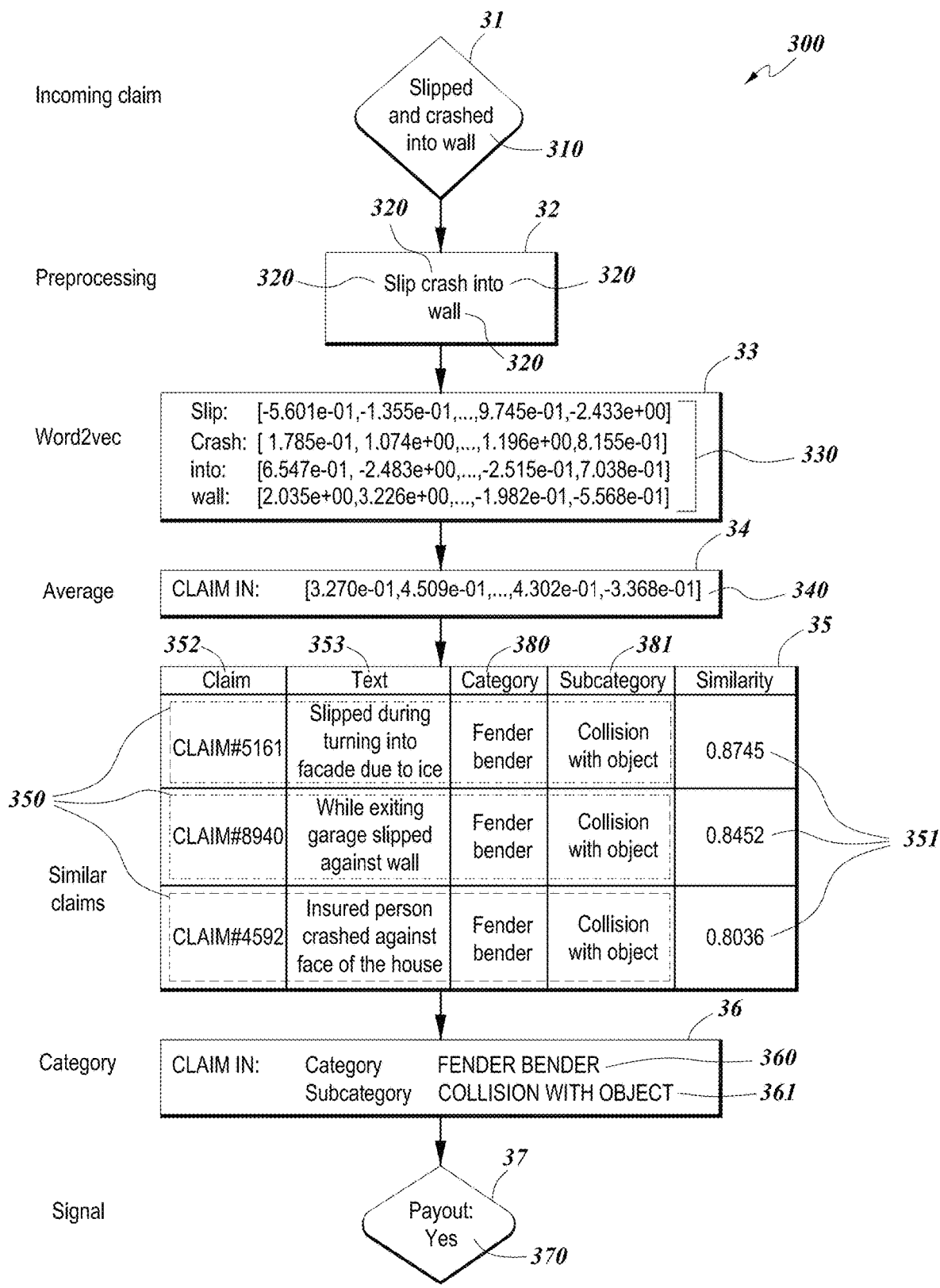
FIG. 3 shows a flowchart relating to a single-model example embodiment.

FIG. 3 shows a flowchart 300 relating to a single-model example embodiment. Where e.g. Example 4 and 5 relate to an ensemble of two models, the present example assumes a single model relying on similarity, particularly cosine similarity:

$$\cos\theta = \frac{\vec{a}\cdot\vec{b}}{\|\vec{a}\|\|\vec{b}\|}.$$

In this example, the request is an insurance request and the request description is a single insurance claim 310 being a single natural text string. In other embodiments the request may comprise more than one request description. Similarly, in different embodiments each request description may comprise more than one natural language text string.

The request is categorized using a single model based on cosine similarity. It is assumed that access is provided to a database comprising a plurality of previously categorized requests each comprising a category 380 and a vocabulary comprising a plurality of word vector representations 340.

In a first step, the incoming claim 310 is received 31 from the user. The claim 310 is a natural language text string "Slipped and crashed into wall". In the preprocessing step, a plurality of component words 320 belonging to the text string is identified 32. Particularly, the text of the incoming claim 310 is preprocessed using the Porter stemming algorithm, converting "slipped" into "slip" 320 and "crashed" into "crash" 320 and stop word removal which removes the word "and", which does not carry any useful information for the model.

In a next step, for each of the component words 320, an associated word vector representation 330 is obtained 330 from said vocabulary. In this example, this corresponds to applying the Word2vec model to the preprocessed text, i.e. the plurality of components words (320). The determining of the vector by the Word2vec model may hereby boils down to retrieving the desired vector representation from the vocabulary directly, but may also involve calculating the desired vector representation based on an entry comprised in the vocabulary and on a further parameter such as a recently processed request description. As such, each word in the preprocessed incoming claim text is converted into a vector. In this example embodiment, the dimension of the vector, i.e. the number of scalar values, is three hundred; only the first and last two elements of each vector are shown for layout reasons. Note that all numbers presented in FIG. 3 are for illustrative purposes only.

In a next step, a request vector 340 is determined 34, based on said at least one obtained word vector representation 330. In this example, the word vector representations 330 are arithmetically averaged 34 into a single request vector 340 for the incoming claim of size three hundred. In other embodiments, this may relate to any vector arithmetic different from arithmetically averaging, such as geometric averaging or a weight-based summation of the word vector representations.

The following step consists of determining 35 a similarity value 351 of the request vector 340 with respect to the likewise determined vector representations of the categorized requests 350. This is done by comparing the incoming claim vector 340 to the vectors of the previously categorized claims 350. The previously categorized claims 350 go through the same steps 32, 33, 34 as the incoming claim 310, resulting in a vector (not shown) of size three hundred per previously categorized claim 350. Using the cosine similarity approach, a cosine distance is calculated between the claim vector 340 and that of all previously categorized claims 350. The values hereof range from −1 (least similar) to 1 (most similar). In this example, the similarity value 351 is entirely based on the cosine distance, i.e. it is equal to it. Based on these similarity values 351, the three most similar categorized claims 350 are selected, i.e. the three categorized claims 350 for which the similarity 351 is highest. As displayed in FIG. 3, each of these three categorized claims 350, like any categorized claim, comprises a claim ID 352, a claim description 353 being a natural language text string, as well as a category 380 and a subcategory 381 that were assigned previously. In this example, the three previously categorized claims 350 agree in their category 380 and subcategory 361, being "Fender Bender".

In a next step, based on these (identical) categories 380 of the previously categorized claims 350 with highest similarity 351, the category 360 of the request 310 is determined 36, being "Fender Bender". In this example, likewise, a subcategory 381 "Collision with object" is available for each of the three categorized claims 350 for which the similarity 351 is highest. Accordingly, this subcategory is attributed as the subcategory 361 of the request 310.

In a final step, a signal 370 is generated 37 relating to said category 360 and said signal 370 is transmitted. Particularly, the category "Fender bender" and subcategory "Collision with object" lead to a pre-defined signal 370 "Payout".

Example 7: Two-Model Example

Figure 4:
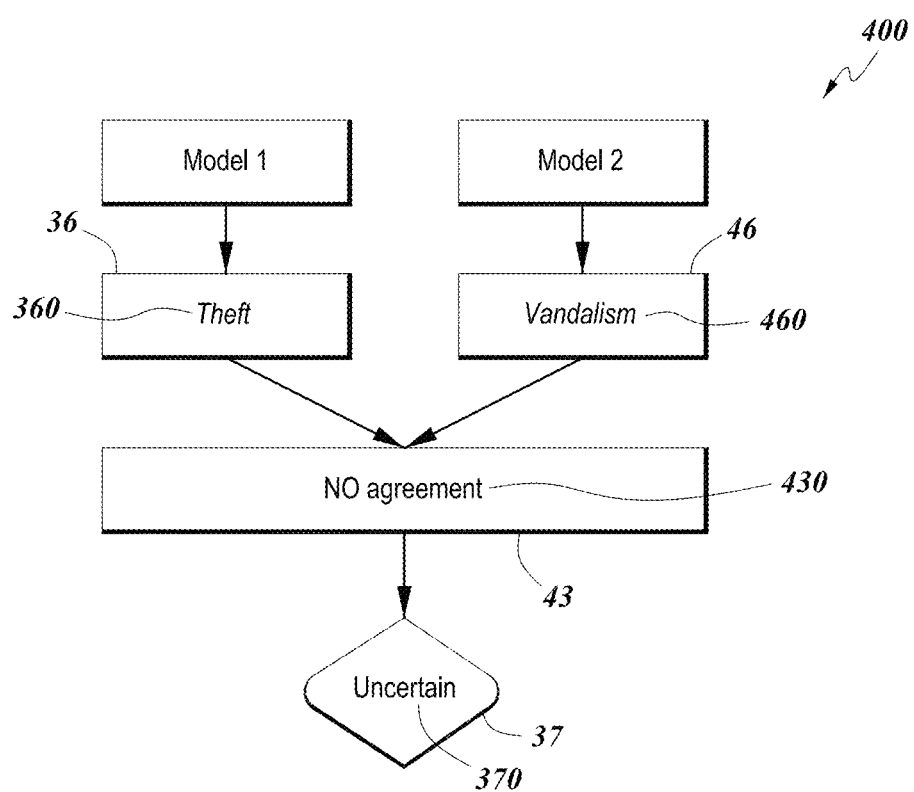
FIG. 4 shows a flowchart relating to a two-model example embodiment.

FIG. 4 shows a flowchart 400 relating to a two-model example embodiment. This example may be considered as such but may preferably be considered in combination with Example 6. A first model operates to assign 36 a first category 360 whereas the second model operates to assign 46 a second category 460. Preferably, the first and second model operate on the same request vector 340 as determined 34 in a separate step according to Example 6. In other words, the first and second model may preferably operate in parallel to move from the request vector 340 to an assigned category 360, 460. Hereby, the first model preferably relates to determining 35 a similarity value 351 of said request vector 340 with respect to a likewise determined vector representation of said categorized request 350, to then, based on said at least one determined similarity value 351 and on the category 380 of the corresponding previously categorized request 350, determine 36 the category 360 of said request 310. The second model preferably relates to applying a CNN to said request vector 340 and a likewise determined vector representation of said categorized request 350, in a first step, to then, based on an output of said CNN and on the category 380 of the corresponding previously categorized request 350, determine 46 a second category 460 of said request 310.

Returning to the steps displayed in FIG. 4, a request with a request description (not shown) being a natural language text string and relating to an insurance claim is processed. The first model proposes 36 a first category 360 "Theft" whereas the second model proposes 46 a second category 460 "Vandalism" being different from the first category 360. In a separate step, an agreement protocol compares 43 the first category 360 to the second category 460. This comparing comprises detecting 430, in this example, that there is no agreement in view of the second category 460 being different from the first category 360. In this example, this leads to generating 37 the signal 370 that the actions to performed are uncertain, in view of the actual claim category being uncertain. Associating an "uncertain" signal to cases where no agreement is found preferably corresponds to requesting intervention from a human operator. In a preferred embodiment, the agreement protocol performs the comparison in view of an accuracy parameter, which may be a discrete (e.g. "HIGH" vs. "MEDIUM" vs. "LOW") or continuous parameter. Hereby, higher values of said accuracy parameter may correspond to the agreement protocol assigning "Uncertain" whenever the category assigned by the multiple models does not entirely agree. This may lead to a high number of claims that have to be handled by a human expert. Low values of said accuracy parameter may correspond to the agreement protocol assigning "Uncertain" only when e.g. more than one model disagrees with the other models of a plurality of at least four models.

Example 8: Example with Image-Based Requests

In this example, the request relates to insurance claims and comprises, preferably consists of, at least one image. The at least one image may be in any pixel-based or vector-based file format, such as PNG, JPEG, GIF, TIFF, EPS, EMF or PDF. This may correspond to the practical case wherein an insurance claim request is completely written out on one or more paper forms, as is conventionally done. This one or more paper form may then be photographed or scanned, leading to at least one form-related image. This at least one image may then, preferably together with some context-related photographs relating to the damage or a location relating to the insurance claim, be bundled in a single request comprising both the pictures of the paper forms and the context-related photographs. This request, being at least one image file comprising at least one form-related image, may then conveniently be uploaded to a server for processing, leading to a user-friendly approach to claim handling. The request may be stored at the server. In a separate step preceding the other steps of the invention, the photographs are automatically sorted through pattern detection, separating the at least one form-related image, on the one hand, from the one or more context-related photographs, if present, on the other hand. In a next step, each of the at least one form-related images may be processed by OCR to generate one or more request descriptions 310, preferably one request description 310, each of the one or more request descriptions 310 comprising at least one natural language text stings. The next steps may then be executed according to Example 6, optionally according to the combination of Example 6 and Example 7. This yields a certain claim category which may be attributed to the entire request. Preferably, in a final step succeeding the other steps of the invention, the claim category may be transmitted to the user that has uploaded the request and/or the claim category may be stored as metadata in the request as stored at the server, i.e. the request data may be updated. Preferably, for each image file, also the label (form-related vs. context-related) is stored.

What is claimed is:

1. A computer-implemented method for determining a category of a request provided by a user by means of a user device; said user device comprising connection means and means for receiving a request description relating to said request from said user; the method comprising the steps of:
    receiving, from said user, said request description, by means of said user device;
    uploading said request description to a server, said server having access to a database comprising a plurality of previously categorized requests each comprising a category and a vocabulary comprising a plurality of word vector representations;
    identifying, by said server, a plurality of component words belonging to a natural language text string comprised in said request description;
    obtaining, for at least one of said plurality of component words, an associated word vector representation from said vocabulary;
    determining a request vector, based on said at least one obtained word vector representation, by averaging the word vector representations arithmetically, geometrically or weight-based;
    for at least one categorized request, determining a similarity value of said request vector with respect to a likewise determined vector representation of said categorized request;
    based on said at least one determined similarity value and on the category of the corresponding previously categorized request, determining the category of said request;
    generating a signal relating to said category and transmitting said signal from said server to a second device, said signal being linked to the category;
    wherein said determining of a similarity value and said determining of the category relates to a first model; wherein the method comprises determining a second category relating to a second model different from said first model, said second model relating to a machine learning algorithm, according to following steps:
    applying said second model to said request vector and a likewise determined vector representation of said categorized request; and
    based on an output of said second model and on the category of the corresponding previously categorized request, determine said second category of said request;
    wherein said generating of said signal comprises comparing of the category to the second category;
    wherein said comparing of the category to the second category comprises detecting a disagreement between said first and said second model if the second category is different from the category, said disagreement leading to said signal being generated comprising an indication of an uncertainty with respect to said category, wherein the first and second model operate on the same request vector, wherein one of said first or second model has preference over an other model of said first and second models, and wherein said first or second model having preference defines said signal if the other model comprises an indication of an uncertainty with respect to said category of said other model;
    wherein said determining of said category and said second category comprises determining whether a confidence indicator exceeds a predefined confidence threshold.

2. The method according to claim 1, wherein said machine learning algorithm to which said second model relates is based at least partly on a convolutional neural network algorithm.

3. The method according to claim 1, wherein said identifying of said plurality of component words comprises preprocessing of said natural language text string, said preprocessing comprising at least stemming according to a stemming algorithm.

4. The method according to claim 1, wherein said determining of said request vector is based at least partly on Word2vec.

5. The method according to claim 1, wherein said determining of said similarity value is based at least partly on a distance measure and/or a similarity measure.

6. The method according to claim 1, wherein said request comprises at least one image comprising at least one paper-form-related image; wherein said receiving comprises receiving said at least one image from the user; wherein said uploading of said request description comprises uploading said at least one image to said server; wherein said identifying said plurality of component words comprises determining, for each of said at least one image, whether the image is a form-related image or a context-related image and, for each form-related image, extracting said natural language text string by means of optical character recognition.

7. The method according to claim 6, wherein, upon said uploading, said request comprises at least one image is stored at said server; and wherein said category determined in said step of determining the category and/or said signal determined in said step of generating said signal is stored as metadata in the request as stored at the server.

8. The method according to claim 1, wherein said generating and transmitting of said signal comprises indicating that an intervention from a human operator is required.

9. The method according to claim 1, wherein said generating and transmitting of said signal comprises sending a notification based on said signal to said user device and having said notification displayed on a screen.

10. A system for determining a category of a request provided by a user by means of a user device, said system comprising:
    a server comprising a processor, tangible non-volatile memory and program code present on said memory for instructing said processor, said server having access to a database comprising a plurality of previously categorized requests each comprising a category and a vocabulary comprising a plurality of word vector representations;
    said user device comprising a processor, a means for user input and a screen;
    said system configured for executing the steps of:
    receiving, from said user, a request description, by means of said user device;
    uploading said request description to said server;
    identifying, by said server, a plurality of component words belonging to a natural language text string comprised in said request description;
    obtaining, for at least one of said plurality of component words, an associated word vector representation from said vocabulary;
    determining a request vector, based on said at least one obtained word vector representation, by averaging the word vector representations arithmetically, geometrically or weight-based;
    for at least one categorized request, determining a similarity value of said request vector with respect to a likewise determined vector representation of said categorized request;
    based on said at least one determined similarity value and on the category of the corresponding previously categorized request, determining the category of said request;
    generating a signal relating to said category and transmitting said signal from said server to a second device, said signal being linked to the category;
    wherein comparing of the category to a second category comprises detecting a disagreement between a first and a second model if the second category is different from the category, said disagreement leading to said signal being generated comprising an indication of an uncertainty with respect to said category, wherein the first and second model operate on the same request vector, wherein one of said first or second model has preference over an other model of said first and second models, and wherein said first or second model having preference defines said signal if the other model comprises an indication of an uncertainty with respect to said category of said other model;
    wherein said determining of said category and said second category comprises determining whether a confidence indicator exceeds a predefined confidence threshold.

11. A non-transitory storage medium comprising instructions, which when executed by an electronic processor, cause the processor to perform a method for determining a category of a request provided by a user, the method, comprising:
    receiving, from said user, a request description, by means of a user device;
    uploading said request description to a server, said server having access to a database comprising a plurality of previously categorized requests each comprising a category and a vocabulary comprising a plurality of word vector representations;
    identifying, by said server, a plurality of component words belonging to a natural language text string comprised in said request description;
    obtaining, for at least one of said plurality of component words, an associated word vector representation from said vocabulary;
    determining a request vector, based on said at least one obtained word vector representation, by averaging the word vector representations arithmetically, geometrically or weight-based;
    for at least one categorized request, determining a similarity value of said request vector with respect to a likewise determined vector representation of said categorized request;
    based on said at least one determined similarity value and on the category of the corresponding previously categorized request, determining the category of said request;
    generating a signal relating to said category and transmitting said signal from said server to a second device, said signal being linked to the category;
    wherein comparing of the category to a second category comprises detecting a disagreement between a first and a second model if the second category is different from the category, said disagreement leading to said signal being generated comprising an indication of an uncertainty with respect to said category, wherein the first and second model operate on the same request vector, wherein one of said first or second model has preference over an other model of said first and second models, and wherein said first or second model having preference defines said signal if the other model comprises an indication of an uncertainty with respect to said category of said other model;
    wherein said determining of said category and said second category comprises determining whether a confidence indicator exceeds a predefined confidence threshold.

* * * * *